United States Patent [19]

Bales et al.

[11] Patent Number: 4,683,866
[45] Date of Patent: Aug. 4, 1987

[54] CHARCOAL COOKER

[75] Inventors: Emmett R. Bales, Morristown; George L. Huff, Greeneville, both of Tenn.

[73] Assignee: Meco Corporation, Greeneville, Tenn.

[21] Appl. No.: 764,247

[22] Filed: Aug. 9, 1985

[51] Int. Cl.$^4$ .............................................. A47J 37/00
[52] U.S. Cl. .................. 126/25 B; 126/147; 126/152 R; 126/30; 126/25 R; 99/449
[58] Field of Search ................. 126/25 B, 25 R, 39 R, 126/25 A, 41 R, 25 AA, 30, 39 H, 9 B, 152 R, 147; 99/449

[56] References Cited

U.S. PATENT DOCUMENTS

| | | | |
|---|---|---|---|
| D. 265,162 | 6/1982 | Bales | D7/110 |
| 2,271,816 | 2/1942 | DeWitt | 126/147 |
| 2,641,243 | 6/1953 | Goss | 126/25 R |
| 2,786,463 | 3/1957 | Vincent | 126/25 R |
| 2,925,028 | 2/1960 | Haynes et al. | 126/25 R |
| 2,998,814 | 9/1961 | Forsberg | 126/147 |
| 3,046,970 | 7/1962 | Seaman | 126/25 R |
| 3,085,562 | 4/1963 | Persinger et al. | 126/25 R |
| 3,121,386 | 2/1964 | Persinger et al. | 126/25 A |
| 3,224,357 | 12/1965 | Rubens | 126/30 |
| 3,279,452 | 10/1966 | Hottenroth et al. | 126/25 R |
| 3,330,266 | 7/1967 | Stephen | 126/25 R |
| 3,500,812 | 3/1970 | Korngold | 126/25 R |
| 3,667,448 | 6/1972 | Dorian | 126/25 R |
| 3,692,012 | 9/1972 | Wiggini | 126/25 R |
| 3,841,299 | 10/1974 | Tomita | 126/25 B |
| 3,967,613 | 7/1976 | Rybak et al. | 126/41 R |
| 4,023,553 | 5/1977 | London et al. | 126/25 B |
| 4,062,340 | 12/1977 | Huff | 126/25 R |
| 4,089,258 | 5/1978 | Berger | 99/339 |
| 4,281,633 | 8/1981 | Wackerman | 126/25 R |
| 4,463,746 | 8/1984 | Knuth et al. | 126/25 R |
| 4,503,835 | 3/1985 | Williams | 126/25 B |
| 4,506,653 | 3/1985 | Bigelow et al. | 126/77 |
| 4,512,249 | 4/1985 | Mentzel | 126/9 B |

OTHER PUBLICATIONS

Article from the magazine entitled "Appliance Manufacturer", Jul. 1985, issue on More Pizazz for Gas.
Copy of brochure from Ducane Heating Corporation, 800 Dutch Square Blvd., Columbia, S.C. 29210 on their SPORTSLINE '78 Barbecue and Char-cook Grills.

Primary Examiner—Samuel Scott
Assistant Examiner—H. A. Odar
Attorney, Agent, or Firm—Luedeka & Neely

[57] ABSTRACT

A charcoal cooker has a cooker bowl and a lid dimensioned to cover the bowl during cooking. Food is supported within the cooker on a support structure such as a rotisserie rod or a grid. A primary grate is disposed within the bowl below the food support structure and is configured to support a charcoal fire and an upper grate is disposed at an elevation within the bowl above the primary grate but below the food support structure. The upper grate is configured to support a charcoal fire and is spaced from the primary grate at a sufficiently small distance so that a charcoal fire on the primary grate will ignite charcoal disposed on the upper grate. In this manner a long lasting charcoal fire may be achieved by starting a fire on the primary grate and placing fresh charcoal on the upper grate for subsequent ignition and burning. An ash pan is dimensioned to fit snugly below the primary and upper grate for catching ash and reflecting heat, and through the use of a lower front vent and an upper rear vent, an upwardly and rearwardly directed airflow is achieved which facilitates transfer of heat from the area of the primary grate to the upper grate.

8 Claims, 9 Drawing Figures

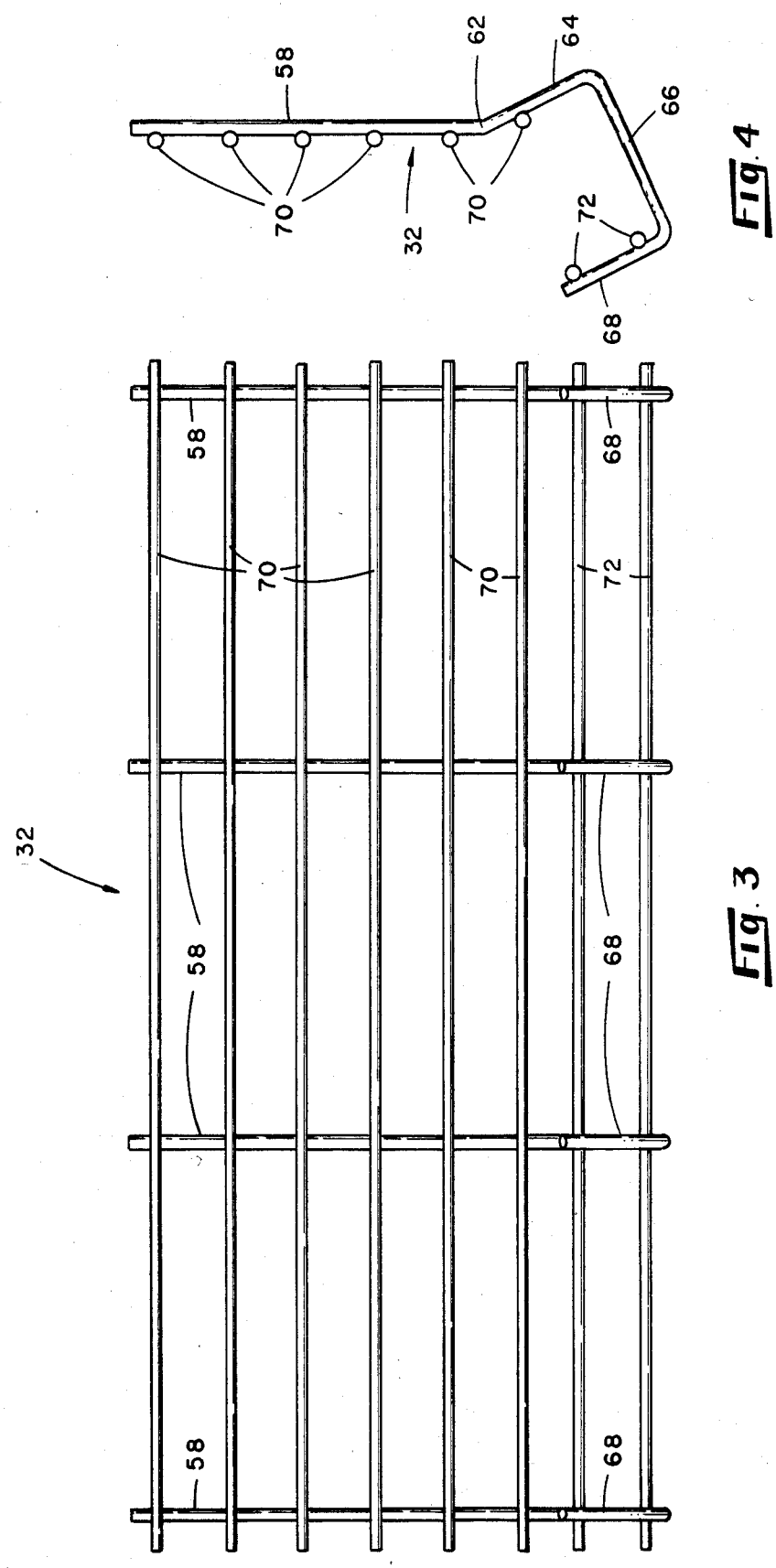

CHARCOAL COOKER

FIELD OF INVENTION

The present invention relates to charcoal cookers and particularly relates to a charcoal barbecue grill having a primary grate and an upper grate designed to provide a long-lived charcoal fire.

BACKGROUND AND SUMMARY OF THE INVENTION

The barbecue grill of the present invention is particularly useful in rotisserie or similar cooking operations because it provides a long-lived fire. A conventional charcoal grill typically provides a bowl, a lid and a rotisserie rod mounted for rotation in the upper center of the volume defined by the bowl and lid. Slow cooking at a relatively low temperature for a substantial period of time is best for rotisserie cooking, smoking and like cooking methods. When usually a conventional charcoal grill, the charcoal is usually piled high on the grate to provide the longest burning fire possible. Vents are usually provided in the bowl and/or lid to control the air supply to the fire and, in order to provide the relatively low heat necessary for rotisserie cooking, the air supply is choked off to the minimum necessary to keep the fire alive.

Even with the charcoal piled high and the air supply restricted to a minimum, a charcoal fire in a conventional grill will not burn long enough for most rotisserie cooking needs. Usually, a charcoal fire will last about two hours, at best, in a conventional grill. Thus, a need exists for a charcoal grill that maximizes the duration of the charcoal fire during rotisserie or other slow cooking methods.

The grill of the present invention achieves a charcoal fire life of 4 hours or more by providing a modified grate and airflow system. In accordance with the present invention, a barbecue cooker has a cooker bowl with an opening, a bottom, a front side, a rear side and two lateral sides. A lid is dimensioned to cover the bowl opening and a support structure is provided for supporting food above the bowl floor. The cooker of the present invention includes an improved grate. A primary grate is disposed within the bowl below the food support structure and is configured to support a charcoal fire. An upper grate is disposed at an elevation above the primary grate but below the food support structure and is configured to support a charcoal fire. The upper grate is spaced from the primary grate at a sufficiently small distance so that a charcoal fire on the primary grate will ignite charcoal disposed on the upper grate. Thus, a long-lived charcoal fire may be achieved by starting a fire on the primary grate and placing fresh charcoal on the upper grate for subsequent ignition and burning.

In the preferred embodiment of the present invention, the primary grate and the upper grate are formed as a single unit with the upper grate being supported on uprights that extend from the primary grate to the upper grate. Preferably, the upper grate is located near the rear of the cooker bowl.

Also, in the preferred embodiment, appropriate airflow within the cooker is achieved by a lower front vent formed on the front side of the bowl and an upper rear vent formed in the rear of the lid. Both the lower front vent and the upper rear vent include dampers or other control structure to control the flow of air through the vents. With the vents located in such positions, an upward and rearward airflow is induced within the cooker which facilitates heat transfer from the primary grate to the upper grate. Thus, the airflow will facilitate the ignition of charcoal on the upper grate by a fire existing on the primary grate.

The grill of the present invention may also be used as a standard outdoor cooking grill with a cooking grid on which steaks or other food may be grilled. When cooking outdoors, it is often desirable to grill different items of food to different degrees of doneness. For example, for reasons of personal taste, it may be desirable to cook one steak to a medium-rare condition and another to medium-well. Using a convention grill, one method of accomplishing this result is to cook some steaks directly over the charcoal fire and to cook others to one side of the fire. This method is not satisfactory because the rare steaks tend to be cooked unevenly and it is difficult to predict the cooking time of the various steaks. In utilizing the present invention for grilling steaks and the like on a cooking grid, two levels of fire may be used. A fire may be started on both the upper grate and the primary grate at the same time and, of course, the fire on the upper grate will be much closer to the cooking grid and will provide faster and hotter cooking. Thus, to cook steaks or other food items to different degrees of doneness on the same cooking grid, the medium-well steaks may be placed on the grid above the upper grate and the medium-rare steaks may be placed over the primary grate. In this manner, all steaks are cooked evenly and directly over the fire and cooking time is much more predictable.

BRIEF DESCRIPTION OF THE DRAWINGS

The above-described and other advantages of the present invention will become readily apparent and may best be understood by reference to the following Detailed Description when considered in conjunction with Drawings in which the accompanying:

FIGS. 3 and 4 are, respectively, a top view and a side view of the charcoal grate used in the present invention;

DETAILED DESCRIPTION

Figure 1:
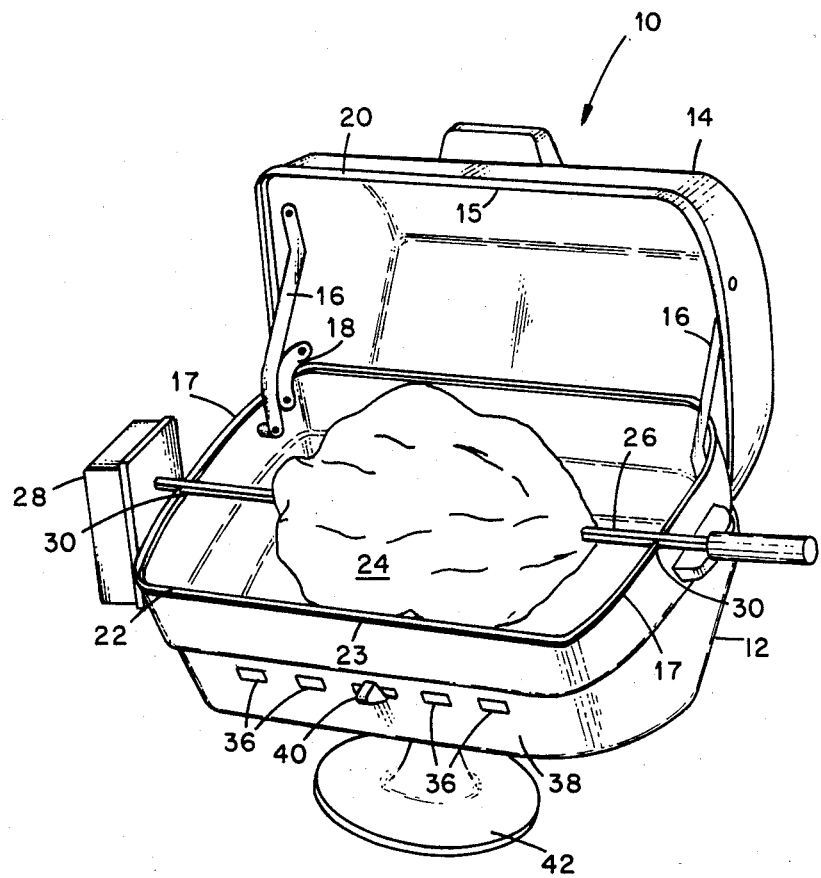
FIG. 1 is a perspective view of the cooker of the present invention shown cooking a turkey on a rotisserie rod.

Referring now to the drawings in which like reference characters designate like or corresponding parts throughout the several views, there is shown in FIG. 1 a grill 10 embodying one form of the present invention. The grill 10 includes a lower grill bowl 12 with a lid 14 dimensioned to fit over the bowl 12. The lid 14 is secured to the bowl 12 by interacting hinge arms 16 and 18 that are pivotally secured on one end to the lid 14 and on the other end to the bowl 12. In FIG. 1, the lid 14 is shown in a fully opened position. When the lid 14 is rotated forward, the hinge arm 16 causes the front edge 15 of the lid 14 to rotate forwardly and downwardly toward the bowl 12, and the hinge arm 18 causes the rear edge of the lid 14 to rotate first upwardly and then downwardly in an arc so that the lid 14 is secured over the bowl 12. A lip 20 is formed around the periphery of the lid 14 with dimensions sufficient to fit over a flange 22 that is formed along the peripheral edge of the bowl 12.

The opening of the bowl 12 is defined by the flange 22 and its depth dimension is angled at approximately 30° with respect horizontal to form two inclined side edges 17. Similarly, when the lid is closed, the lip 20 of the lid will be inclined at an angle of about 30° with respect to horizontal. This inclination angle provides a low front bowl edge 23 so that food is easily placed on and removed from the grill 10, and the rear portion of the bowl 12 in combination with the lid 14 provides a wind screen along the rear of the grill 10.

In FIG. 1, a turkey 24 is shown cooking on a rotisserie rod 26 which is rotatably driven by a drive unit 28. The unit 28 is conveniently mounted on the bowl 12 such as with bolts or screws. The rotisserie rod 26 is supported in a pair of U-shaped channels 30 in the upper edges 17 of the lateral sides of the bowl 12. It should be noted that the inclination of the lateral side edges 17 provides necessary elevation for the rotisserie rod 26 and it is not necessary to provide brackets or other support means for the rotisserie rod 26.

The grill 10 is a charcoal burning grill and it includes a charcoal grate 32 and an ash pan 34 disposed in the bottom of the grill to support a charcoal fire beneath the turkey 24. Four vents 36 are formed on the lower front side 38 of the bowl 12 for admitting air into the grill 10, and the amount of air admitted is controlled by sliding a handle 40 in a horizontal direction along the face of side 38.

The grill 10 shown in FIG. 1 is a tabletop model that rests upon a stand 42 which is sized to fit on a picnic table or the like. Of course, this grill could also be constructed with legs so that it would be freestanding.

Figure 2:
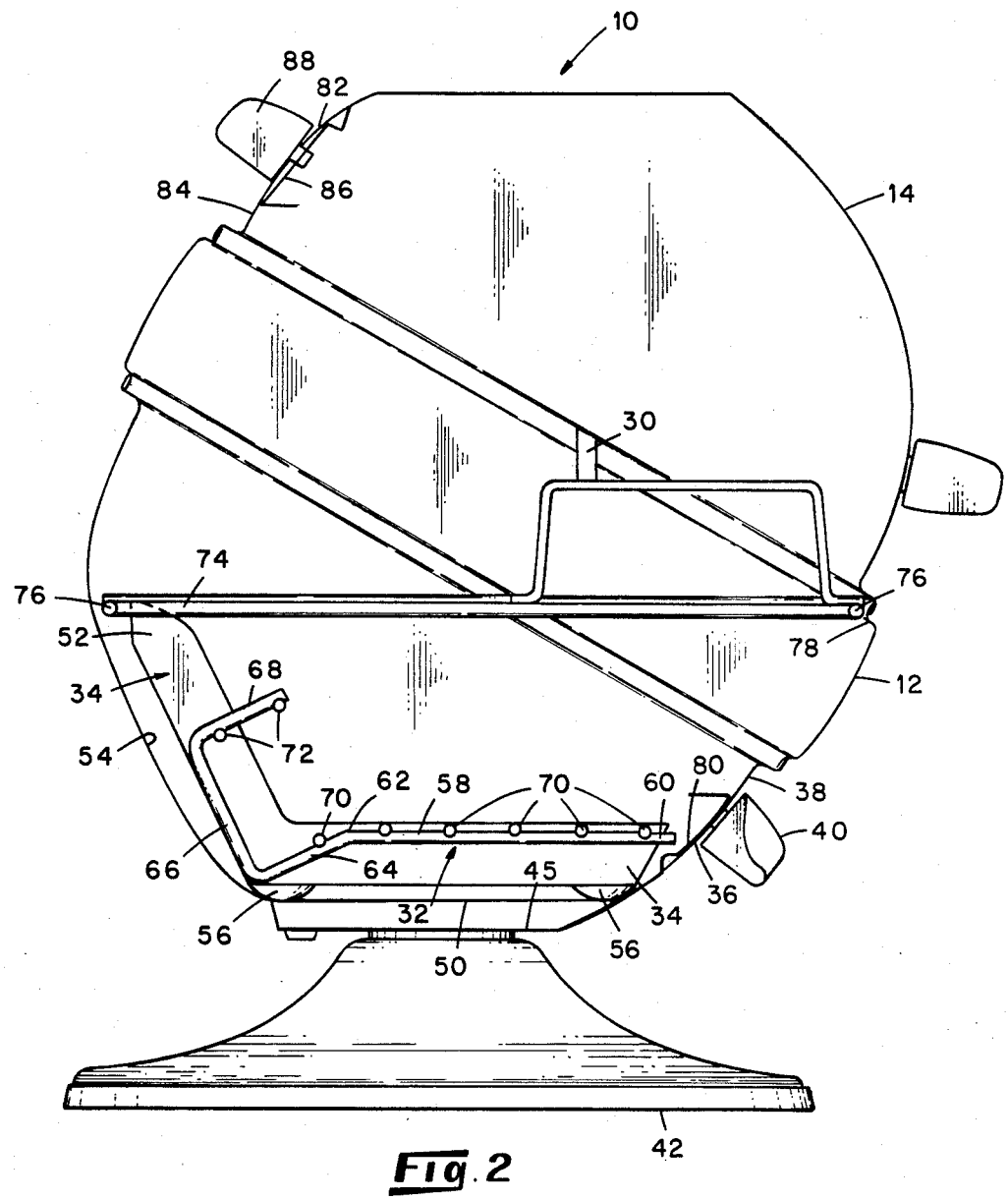
FIG. 2 is a somewhat diagrammatical cross-sectional view of the grill emphasizing a charcoal grate and ash pan.

Referring now to FIG. 2, there is shown a somewhat diagrammatical cross-section of the grill 10 emphasizing the grate 32 and ash pan 34. The ash pan 34 is dimensioned to fit snugly on the floor 50 of the bowl 12, and the pan 34 includes a rear upright portion 52 that is positioned adjacent to the rear upright wall 54 of the bowl 12. The ash pan 34 rests upon hemispherical indents 56 that protrude downwardly from the ash pan 34.

The grate 32 includes main cross beams 58 that extend from slots 60 formed in the front of the ash pan 34 and extend rearwardly to bends 62 that are disposed near the rear of the bowl 12, the rear being defined as the left side of the bowl 12 in FIG. 2. Extending downwardly and rearwardly from the bends 62 at an angle of about 25° with respect to horizontal are leg sections 64, and extending upwardly from the leg sections 64 are upright sections 66 of the grate 32. The upright sections 66 are inclined at about 65° with respect to horizontal and are, thus, perpendicular to the leg sections 64. Top beams 68 extend upwardly and forwardly in a parallel relationship with the leg sections 64 at angles of about 25° with respect to horizontal. The main beams 58, the leg sections 64, the upright sections 66 and the top beams 68 function to support a plurality of lower cross members 70 and upper cross members 72 which are spaced apart at a sufficiently close distance to support charcoal briquets above them.

In FIG. 2 a cooking grid 74 is shown mounted on supports 76 immediately above the ash pan 34, and, preferably, the grid 74 is positioned at an elevation corresponding to the front edge 78 of the bowl 12. Thus, it may be appreciated that the grill 10 may be used either as a rotisserie grill as shown in FIG. 1, or as a standard barbecue grill as shown in FIG. 2.

The configuration of the grate 32 and the ash pan 34 provide advantages when the grill 10 is used either as a standard barbecue grill or as a rotisserie. When the grill 10 is used as a rotisserie, it is desirable to have the charcoal burn at a low heat for as long as possible with the lid 14 in a closed position as shown in FIG. 2. With most grills, a charcoal fire for a rotisserie grill will last about 2 hours under ideal conditions. To achieve ideal conditions, the charcoal must be piled correctly and the fire must be maintained at a sufficiently high temperature within the grill, to keep the fire going and the food cooking. But the fire temperature should be as low as possible to achieve slow cooking, no flame-ups, and long fire life.

Using the grill of the present invention, a rotisserie cooking time of about 4 hours may be achieved by appropriately loading charcoal onto the grate 32. To start the fire, charcoal is placed on the lower cross members 70 and they are ignited. After the charcoal on the lower cross members 70 is properly burning, fresh charcoal briquets are piled onto the upper cross members 72. Approximately one-third of the total charcoal used in the cooking process is placed on the upper members 72. Soon after the fresh charcoal is placed on the upper cross members 72, the lid 14 is closed and the rotisserie cooking begins. The primary charcoal fire that has been started on the lower cross members 70 provides the initial heat for cooking and at the same time it provides heat for slowly igniting the charcoal that is piled on the upper cross members 72. As the primary charcoal fire on the lower cross members 70 burns down, the charcoal on the upper cross members 72 begins burning with increasing heat until the upper fire on upper cross members 72 begins to provide the primary heat source for the rotisserie cooking.

By reference to FIGS. 1 and 2, it will be appreciated that the rotisserie rod 26 is placed in U-shaped channels 30 so that the food cooking on the rotisserie rod 26 will be approximately equidistantly spaced from the charcoal fires on the lower cross members 70 and the upper cross members 72. Thus, even though the upper fire is at a higher elevation, it is approximately the same distance from the food and will provide approximately the same cooking heat.

Also, it should be noted that the ash pan 34 provides a dual function. It protects the bottom of the bowl 12 and it serves as a reflector of heat. The upright portion 52 of the ash pan 34 tends to reflect heat from the charcoal fire upwardly and forwardly toward the U-shaped channel. Thus, the shape of the ash pan 34 tends to focus heat on the food being cooked on a rotisserie rod 26.

With continuing reference to FIG. 2, it may be appreciated that air vents 36 are provided on the front wall 38 of the bowl 12. These air vents 36 are also shown in FIG. 1. A control plate 80 is movable by sliding the handle 40 in a horizontal direction as best shown in FIG. 1. The plate 80 has apertures formed in it that may be aligned with the air vents 36 so that air may flow freely through the vents. The control plate 80 is moved to a misaligned position to reduce airflow and, when totally misaligned, the airflow is substantially blocked through the air vents 36. A plurality of vents 82, preferably four vents, are provided on the rear wall 84 of the lid 14. The airflow through the vents 82 is controlled by a control plate 86 that may be manipulated by a handle 88. The sizing of the vents 82 and the construction of the control plate 86 and the handle 88 is substantially identical to that of handle 40 and control plate 80.

The construction of the vents 36 and 82, the handles 40 and 88, and the control plates 80 and 86 are considered conventional. However, the positioning of these vents in the grill 10 is functionally interrelated with the grate 32 and its intended use. As hot air rises within the grill 10, air will enter the grill 10 through the vents 36 and will exit through vents 82. Thus, the airflow within the grill 10 will be upwardly and rearwardly. It will be noted that the upper cross members 72 are positioned upwardly and rearwardly from the lower cross members 70 and, thus, the upward and rearward airflow helps transfer heat from a fire on the lower cross members 70 to the charcoal that has been placed on the upper cross members 72.

Although the upper cross members 72 of the grate 32 are primarily designed to provide increased rotisserie cooking time, the upper cross members 72 also provide a useful function when a conventional barbecue grid 74 is used in the grill 10. Often, it is desirable to cook food to different degrees of doneness on the same grill. Conventionally, this is accomplished by placing food that is to be cooked to "well done" directly over burning charcoal and placing food that is desired to be cooked to a lesser degree of doneness around the periphery of the charcoal.

The primary disadvantages of this arrangement is that the food placed on the periphery of the charcoal is, necessarily, not over charcoal and it is cooked unevenly.

By utilizing the grate 32 of the present invention, food may be cooked to different degrees of doneness on the same grid 74 with all of the food being placed over charcoal. To accomplish this, charcoal is placed on both the upper cross members 72 and the lower cross members 70 and all of the charcoal is started at the same time. The charcoal on the upper members 72 is necessarily much closer to the grid 74 and, thus, the heat radiated toward the grid 74 will be much more intense toward the rear of the grill 10 than toward the front. The food that is desired to be cooked to a high degree of doneness may be placed toward the rear of the grill and the food that requires a lesser degree of doneness may be placed in the middle and toward the front of the grill. In this cooking arrangement, both the well-done and the less well-done food is placed directly over charcoal and will receive relatively even cooking. Also, since the well-done food is being cooked at a higher temperature, all of the food on the grid will be done at approximately the same time. The upright portion 52 of the ash pan 34 will carry drippings from the food away from the rear of the grill 10. This draining action will help minimize the possibility of flame flareups under the rearmost portion of the cooking grid 74.

FIGS. 3 and 4 are provided to fully and accurately illustrate the construction of the grate 32. FIG. 3 is a top view of the grate 32 and FIG. 4 is a side view thereof. In these views it may be appreciated that it is preferred to use four main beams 58 and corresponding sections 64 and 66 and top beam 68.

Figure 5:
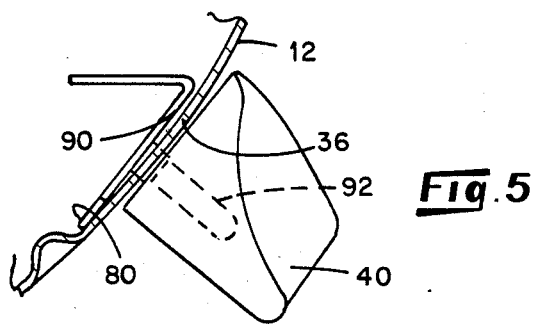
FIG. 5 is a detail view showing the construction of the vent and control plate.
Figure 6:
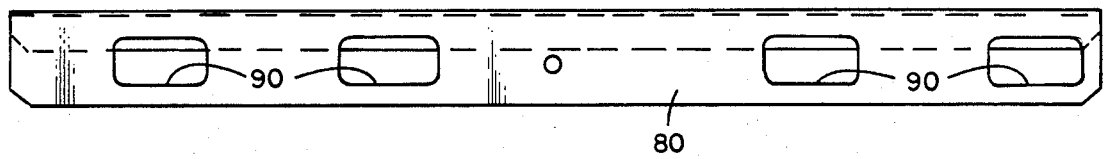
FIG. 6 is a detail view of the control plate used to control airflow through the vents.

FIGS. 5 and 6 illustrate in greater detail the construction of the air vents 36, control plates 80 and handle 40. FIG. 5 is a detail view of the control plate 80 and handle 40 mounted on the bowl 12, and FIG. 6 is a plan view of the control plate 80. Referring to FIGS. 1, 5 and 6, it may be appreciated that the control plate 80 includes apertures 90 that are substantially the same size as the air vents 36. By sliding the control plate horizontally, the apertures 90 may be aligned and misaligned with the air vents 36 to control the airflow as desired.

Figure 7:
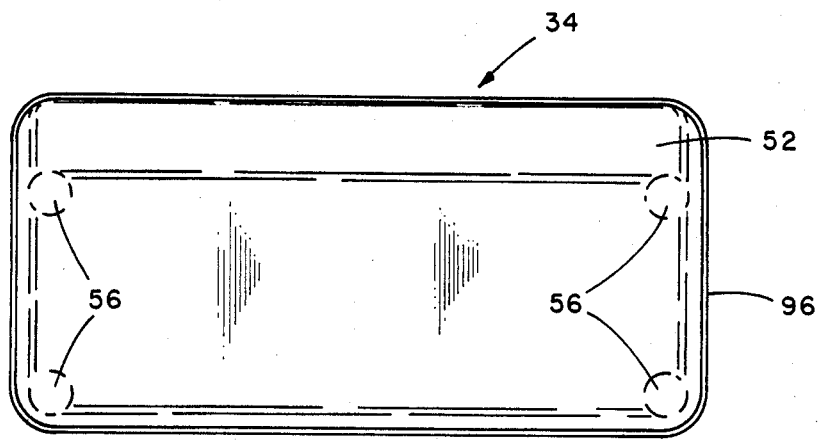
FIGS. 7, 8 and 9 are, respectively, top, side and end views of the ash pan.
Figure 8:
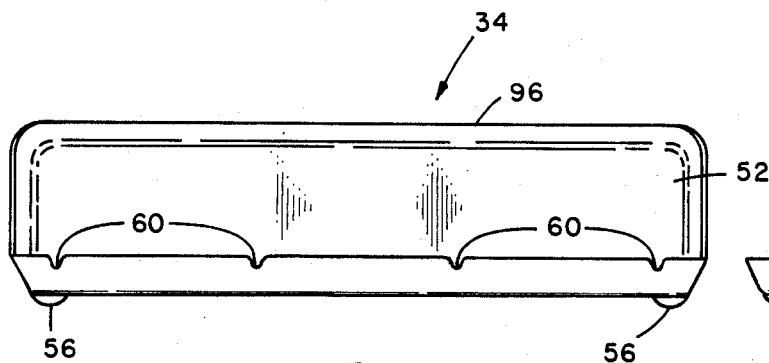
Figure 9:
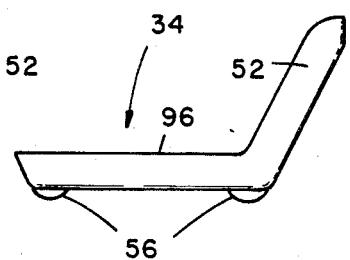

Referring now to FIGS. 7, 8 and 9, the detailed construction of the ash pan 34 may be best appreciated. FIG. 7 is a top view of the ash pan 34, FIG. 8 is a side view and FIG. 9 is an end view thereof. By reference to these views, it may be appreciated that four detents 56 are used to support the ash pan 34 and the ash pan 34 includes slots 60 that support the ends of the four main beams 58. The peripheral edge of the ash pan 34 is curved and bent upwardly to provide a lip 96 extending about the entire periphery of the ash pan 34. This lip 96 retains ashes, drippings and the like within the pan.

Having thus fully described the preferred embodiment of the invention, it will be appreciated that the configuration of the grate 32 and the ash pan 34 in combination with the configuration of the bowl 12 and the lid 14 provide for an advantageous method of cooking on both a conventional barbecue grid 74 and on a rotisserie rod 26. Although a particular embodiment has been described above, it will be understood that the invention is capable of numerous rearrangements, modifications and substitutions of parts without departing from the scope of the invention as defined in the appended claims.

What is claimed is:

1. In a barbecue cooker having a cooking vessel with an opening, a bottom, a front side, a rear side, and two lateral sides, a lid for closing the opening of said vessel, said lid having a front and rear for being positioned over the front and rear sides of said vessel opening, respectively, the improvement comprising:

a primary grate disposed within said vessel above the bottom of the vessel and being configured to support a charcoal fire, said primary grate having a front adjacent to the front side of the vessel and a rear disposed distally from the front of the primary grate towards the rear side of the vessel;

at least one support member extending generally upwardly from the rear of said primary grate and being disposed adjacent to the rear side of said vessel; and an upper grate supported on said support member at an elevation above said primary grate and substantially adjacent to said rear side of said bowl, said upper grate being configured to support a charcoal fire and proportioned to extend over only a portion of said primary grate so that a continuous unobstructed open space is defined above said primary grate between said primary grate and the food support structure in the area above said primary grate beyond the extension of said upper grate over said primary grate, and said upper grate being spaced from said primary grate at a sufficiently small distance so that a charcoal fire on said primary grate will ignite charcoal disposed on said upper grate, whereby a long lasting charcoal fire may be achieved by starting a fire on said primary grate and placing fresh charcoal on said upper grate for subsequent ignition and burning.

2. The improvement of claim 1 further comprising:

a lower front vent formed in the front side of said vessel configured to provide a flow of air therethrough into the vessel;

first vent control means for controlling the flow of air through said lower front vent;

an upper rear vent formed in the rear of said lid for providing a flow of air therethrough out of the vessel, said upper rear vent being disposed at an elevation above said lower front vent; and second vent control means for controlling the flow of air through said upper rear vent whereby, when said first and said second vent control means are admitting air through said vents, a fire on said primary grate will produce an upward and rearward airflow from said lower front vent to said upper rear vent to facilitate heat transfer from the area of said primary grate to said upper grate.

3. The improvement of claim 1, further comprising an ash pan having a horizontal portion configured to fit between said primary grate and the inside surface of the vessel adjacent said primary grate and having a generally upright portion configured to fit between said at least one support member and upper grate and the inside surface of the vessel adjacent said support member and upper grate.

4. The improvement of claim 1 wherein said primary grate, at least one support member and upper grate comprise:

a plurality of main beams having first bends formed therein, said main beams extending from a position adjacent to the front side of said vessel toward the rear side of said vessel to said first bends;

a plurality of leg sections having second bends formed therein, said leg sections extending downwardly and rearwardly from said first bends to said second bends;

a plurality of upright sections having third bends formed therein, said upright sections extending upwardly and rearwardly from said second bends to said third bends;

a plurality of upper beams extending generally forwardly from said third bends and being positioned adjacent to the rear side of said vessel;

a plurality of first cross members attached to and extending substantially perpendicularly between said main beams for supporting a charcoal fire; and a plurality of second cross members attached to and extending substantially perpendicularly between said upper beams for supporting a charcoal fire.

5. The improvement of claim 4 further comprising an ash pan for catching ash and configured to reflect heat towards the inside of the vessel, said ash pan having a horizontal portion configured to fit between at least said main beams and first cross members and the inside surface of the vessel adjacent said main beams and first cross members, said horizontal portion having a rear disposed adjacent the rear of the vessel, and said ash pan having an upright portion extending upwardly and rearwardly from said rear of said horizontal portion and being configured to fit between said upright sections and upper beams and the inside surface of the vessel adjacent said upright sections and upper beams.

6. In a barbecue cooker having a cooking vessel with an opening, a bottom, a front side, a rear side, and two lateral sides, a lid dimensioned to cover the vessel opening, and a support structure for supporting food above the bottom of the vessel, the improvement comprising:

a primary grate disposed within said vessel below said food support structure adjacent the bottom of the vessel, said primary grate being configured to support a charcoal fire and proportioned to generally cover the bottom of the vessel; and an upper grate disposed at an elevation between said primary grate and the food support structure, said upper grate being configured to support a charcoal fire and proportioned to extend over only a portion of said primary grate so that a continuous unobstructed open space is defined above said primary grate between said primary grate and the food support structure in the area above said primary grate beyond the extension of said upper grate over said primary grate, and said upper grate being spaced from said primary grate at a sufficiently small distance so that a charcoal fire on said primary grate will ignite charcoal disposed on said upper grate whereby a long lasting charcoal fire may be achieved by starting a fire on said primary grate and placing fresh charcoal on said upper grate for subsequent ignition and burning.

7. The cooker of claim 6 wherein said upper grate is disposed adjacent the rear of said vessel.

8. The cooker of claim 6, further comprising an ash pan dimensioned to fit snugly between said primary and upper grates and the inside surface of the vessel adjacent said primary and upper grates for catching ash and configured to reflect heat generated by combustion of charcoal on said primary and upper grates towards the interior of the vessel.

* * * * *